(12) United States Patent
Kwon et al.

(10) Patent No.: US 8,005,154 B2
(45) Date of Patent: Aug. 23, 2011

(54) METHOD AND APPARATUS FOR TRANSMITTING AND RECEIVING SHARED CONTROL CHANNEL MESSAGE IN A WIRELESS COMMUNICATION SYSTEM USING ORTHOGONAL FREQUENCY DIVISION MULTIPLE ACCESS

(75) Inventors: Hwan-Joon Kwon, Suwon-si (KR); Jin-Kyu Han, Seoul (KR); Dong-Hee Kim, Yongin-si (KR); Jae-Chon Yu, Suwon-si (KR); Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 828 days.

(21) Appl. No.: 11/964,325

(22) Filed: Dec. 26, 2007

(65) Prior Publication Data
US 2008/0165872 A1 Jul. 10, 2008

(30) Foreign Application Priority Data

Dec. 22, 2006 (KR) ........................ 10-2006-0133210

(51) Int. Cl.
*H04L 27/28* (2006.01)
(52) U.S. Cl. ........................................ 375/260
(58) Field of Classification Search .................. 375/260, 375/130; 370/329, 321, 349, 535
See application file for complete search history.

(56) References Cited

U.S. PATENT DOCUMENTS

2007/0177569 A1* 8/2007 Lundby .................... 370/349
2010/0195588 A1* 8/2010 Wan et al. ................ 370/329

* cited by examiner

*Primary Examiner* — Khai Tran
(74) *Attorney, Agent, or Firm* — The Farrell Law Firm, P.C.

(57) ABSTRACT

A method and apparatus for transmitting/receiving a shared control channel message in an Orthogonal Frequency Division Multiple Access (OFDMA) wireless communication system are provided. The message transmission apparatus receives feedback information from a terminal; determines whether to transmit data by applying precoding; and transmits, in the shared control channel message, control information whose message type is differently set according to the application of the precoding. The message reception apparatus receives the shared control channel message from a base station; determines a message type of the shared control channel message; and if the message type is a Transmit Diversity (TD)-Forward Link Assignment Message (FLAM), demodulates data by at least one of Single Input Single Output (SISO) and Spatial Time Transmit Diversity (STTD) as indicated by the TD-FLAM.

38 Claims, 8 Drawing Sheets

METHOD AND APPARATUS FOR TRANSMITTING AND RECEIVING SHARED CONTROL CHANNEL MESSAGE IN A WIRELESS COMMUNICATION SYSTEM USING ORTHOGONAL FREQUENCY DIVISION MULTIPLE ACCESS

PRIORITY

This application claims priority under 35 U.S.C. §119(a) to a Korean Patent Application filed in the Korean Intellectual Property Office on Dec. 22, 2006 and assigned Serial No. 2006-133210, the disclosure of which is incorporated herein by reference.

BACKGROUND OF THE INVENTION

1. Field of the Invention

The present invention relates generally to a wireless communication system using Orthogonal Frequency Division Multiple Access (OFDMA), and more particularly, to a method and apparatus for transmitting and receiving a shared control channel message in an OFDMA wireless communication system.

2. Description of the Related Art

In general, OFDMA is a system that supports multiple access technologies over different subcarriers using multiple orthogonal subcarriers.

Commonly, a forward link of the OFDMA system supports various transmission technologies using multiple transmit antennas, for data transmission. The various antenna technologies include a Single Input Single Output (SISO) technology, a Single Input Multi Output (SIMO) technology, a Transmit Diversity technology, and a Multi Input Multi Output (MIMO) technology. Generally, terminals transmit, to a base station, and feedback information for efficiently supporting the various transmission technologies in a reverse link. The feedback information includes a Channel Quality Indicator (CQI), a preferred precoder index, a preferred number of ranks, etc., based on the characteristic of the wireless channel estimated by the terminal. The term 'precoder,' as used herein, refers to the information including a weight(s) multiplied by the multiple antennas. The term 'number of ranks,' as used herein, refers to the number of data streams transmitted via a given number of antennas.

When MIMO is realized using multiple antennas, a precoding method is used for adaptively forming transmission beams according to the channel state. The term 'precoding,' as used herein, refers to an operation in which a transmitter pre-distorts a transmission signal before transmitting the signal via a transmit antenna. If the precoding is realized by linear combining, the precoding process can be expressed as Equation (1).

$$x = Es \quad (1)$$

where 's' denotes a signal that the transmitter intends to transmit with a K×1 vector, and 'x' denotes a signal that the transmitter actually transmits with an M×1 vector. Here, 'K' denotes the number of symbols which are simultaneously transmitted with the same resources by MIMO, and 'M' denotes the number of transmit antennas. In addition, 'E' denotes an N×K precoding matrix. That is, Equation (1) expresses that a MIMO transmitter, with M transmit antennas, simultaneously transmits K signal streams by applying a precoding scheme, called E.

The precoding matrix E is adaptively determined according to the transmission MIMO channel. However, when the transmitter cannot acquire information on the transmission MIMO channel, it performs precoding according to the feedback information reported by a receiver. To this end, a precoding codebook including a finite number of preceding matrixes E is preset between the transmitter and the receiver. The receiver selects its most-preferred precoding matrix E in the current channel state from the precoding codebook, and feeds it back to the transmitter, and the transmitter performs MIMO transmission by applying the precoding.

For the transmission signal of Equation (1), a signal received over a MIMO channel H is expressed as Equation (2).

$$y = Hx + z = HEs + z \quad (2)$$

where 'y' and 'z' are each an N×1 vector, and denote signals and noises received at N receive antennas, respectively, and 'H' is an N×M matrix, and denotes a MIMO channel. The received signals undergo a reception combining process so as to improve a Signal-to-Interference and Noise Ratio (SINR) of transmission signal streams for each layer. The signal r that has undergone the reception combining process is expressed as Equation (3).

$$r = Wy = WHx + Wz = WHEs + Wz \quad (3)$$

where 'W' is an N×N matrix, and denotes a reception combining process, and 'r' is an N×1 signal vector. To more correctly receive the transmission signal streams of each layer, it is possible to also use a reception technique such as interference cancellation and Maximum Likelihood (ML) reception.

The reception technique can be classified into a Single-CodeWord (SCW) scheme and a Multi-CodeWord (MCW) scheme according to the number of coded packets from which multiple signal streams transmitted by the MIMO technique were generated.

FIG. 1 is a diagram illustrating a structure of an SCW MIMO transceiver.

The SCW MIMO transmitter includes a channel coding and modulation unit 101, a demultiplexer 103, a precoder 105, transmission processors 107a to 107m, and transmit antennas 109a to 109m. The SCW MIMO receiver includes receive antennas 111a to 111n, reception processors 113a to 113n, a reception combiner 115, a multiplexer 117, and a demodulation and channel decoding unit 119.

The channel coding and modulation unit 101 performs channel coding and modulation on a desired transmission data stream and converts it into one coded packet signal stream. The demultiplexer 103 demultiplexes the signal stream into K signal streams, for MIMO transmission. The precoder 105 linear-converts the demultiplexed K signal streams into M signal streams to be transmitted via the transmit antennas 109a to 109m. Here, the K signal streams are transmitted with different transmission beams. The transmission processors 107a to 107m transmit the precoded M signal streams to the reception side via the transmit antennas 109a to 109m. The transmission processors 107a to 107m each include not only the process of generating CDMA/OFDMA signals, but also the filtering or Radio Frequency (RF) processing process performed at each antenna.

The transmission signal is received at the reception processors 113a to 113n via N receive antennas 111a to 111n. The reception processors 113a to 113n restore the signal received at the receive antennas 111a to 111n to a baseband signal. The reception combiner 115 combines the reception-processed signal, and outputs the combined signal to the multiplexer 117. The multiplexer 117 multiplexes the combined signal, and outputs the multiplexed signal to the demodulation and channel decoding unit 119. The demodulation and channel decoding unit 119 restores the multiplexed signal to the desired original transmission data stream.

According to the SCW MIMO characteristics, because the SCW MIMO transmitter generates multiple transmission signal streams with one channel coding and modulation unit 101, it may receive only one feedback CQI. However, the number K of MIMO-transmitted transmission signal streams, i.e., the number K of transmitted MIMO layers, should be adjusted according to the channel state. Herein, the number K of transmitted MIMO layers is defined as 'rank'. Therefore, the SCW MIMO feedback is composed of one CQI representative of the channel state of the transmission MIMO layer, and the number 'rank' of transmission layers.

FIG. 2 is a diagram illustrating a structure of an MCW MIMO transceiver.

In MCW MIMO, unlike in SCW MIMO, different coded packet signal streams are transmitted separately through MIMO layers.

A demultiplexer 201 first demultiplexes a desired transmission data stream into as many data stream as the rank. Channel coding and modulation units 101a to 101k each perform different channel coding and modulation on the demultiplexed signal streams, and output the signal streams associated with the MIMO layers. The next transmission process is equal to that of SCW MIMO, and the output signal streams proceed through a precoder 105 and each of transmission processors 107a to 107m associated with the transmit antennas 109a to 109m, generating the signals to be transmitted via M transmit antennas 109a and 109m. The MCW MIMO reception process is also equal to the SCW MIMO reception process in several steps immediately after the signal reception. Although the receiver structure of FIG. 2 utilizes an interference canceller 205, by way of example, it may use the other-type reception method. A signal received via N receive antennas 111a to 111n undergoes reception processors 113a to 113n and a reception combiner 115 in order, restoring transmission signals associated with the corresponding layers. The restored signals include their mutual interference.

In MCW MIMO, because the transmission signal underwent different channel coding and modulation separately for each layer, the receiver cancels the first restored signal of a particular layer, thereby removing the interference to the other layer caused by the signal. The use of the interference canceller 205 can improve the channel capacity of the MIMO layers, thereby facilitating transmission of more data by MCW MIMO transmission. An interference cancellation-based reception process is described in greater detail below.

If a one-layer signal is successfully restored by a demodulation and channel decoding unit 203, the interference canceller 205 cancels interference using the restored signal. The interference-canceled signal stream 207 is input back to the demodulation and channel decoding unit 203. The restoration and interference cancellation are repeated until signals of all layers are successfully restored, or there is no more layer signal to be restored.

A multiplexer 209 multiplexes the last restored signal streams associated with the multiple layers, thereby restoring one desired transmission data stream.

According to the MCW MIMO characteristics, because the MCW MIMO transmitter generates multiple transmission signal streams with multiple channel coding and modulation units 101a to 101k associated with the corresponding layers, it should receive feedback CQIs separately for the corresponding layers.

Meanwhile, the rank can be expressed in an immanent way by setting a predefined CQI value indicating 'No Transmission' among the CQI values, instead of separately. Therefore, the MCW MIMO feedback is composed of multiple CQIs representative of the channel states of the transmission MIMO layers.

In the common OFDMA system, the base station transmits pilots to the terminal for coherent demodulation (or coherent detection) of the data transmitted in the forward link, and for quality estimation of the forward channel. The pilots used for the data demodulation are classified into common pilots and dedicated pilots according to their form.

FIG. 3 is a diagram illustrating an example of common pilots.

In FIG. 3, a term 'auxiliary pilot' is used to distinguish a pilot of the first antenna from the pilots for the remaining antennas. The common pilots, transmitted by the base station, are commonly used by several users (or terminals) together. The common pilots can be used for both the data demodulation and the channel quality estimation. The common pilots are characterized in that they are transmitted over the fill available band of the system at fixed periods regardless of the data transmission and resource allocation.

FIG. 4 is a diagram illustrating an example of dedicated pilots.

As illustrated in FIG. 4, a bundle of 8 consecutive OFDM symbols and 16 consecutive subcarriers is commonly called one tile or Block Resource Channel (BRCH). As shown in FIG. 4, various patterns of dedicated pilots can be defined in one tile, and the reason for defining the various pilot patterns is to use an appropriate pilot pattern according to the number of ranks and the channel characteristic. The dedicated pilots, or those pilots transmitted to a particular user, are the pilots that one user, i.e., only the user receiving data over particular resources at a particular time, uses. Therefore, the dedicated pilots are characterized in that they are inserted into particular resources allocated to the user to which data is transmitted at an arbitrary time.

The common OFDMA system can be divided into (i) a system that supports only the common pilots as the pilots for data demodulation in the forward link, (ii) a system that supports only the dedicated pilots, and (iii) a system that supports both of the common pilots and the dedicated pilots.

In the case where the base station uses the common pilots, the base station, when it transmits data over the forward link, applies predetermined precoding for multiple antennas. Therefore, when the base station intends to form one or multiple beams and transmit data over the beams, the base station cannot apply the precoding appropriate for the particular user to the common pilots. This is because the common pilots are commonly utilized for several users. Therefore, when the base station uses the common pilots, and for data transmission, forms beams by applying precoding and transmit data over the beams, a receiver, or terminal, should have information indicating which precoding is applied to the data transmission, in order to perform channel estimation even on the received common pilots taking into account the precoding applied to the data transmission, and to demodulate the data depending thereon.

However, in the case where the base station uses the dedicated pilots, the base station, when it transmits data over the forward link, applies predetermined precoding for multiple antennas. Therefore, when the base station intends to form one or multiple beams and transmit data over the beams, the base station applies the precoding used for the data transmission even to the dedicated pilots in the same way. This is possible because the dedicated pilots are the pilots provided for a particular one user. The foregoing characteristics make the receiver have no need to acquire the information indicating which precoding the transmitter has applied in the process of performing data reception and demodulation to which precoding is applied. That is, because the same precoding is applied to the data and the pilots, the data receiver only needs to perform channel estimation over the pilots for the following reason. That is, because the channel estimation already includes the preceding, the intact channel estimation value can be used for the data demodulation.

The term 'shared control channel' as used herein refers to a channel that is transmitted together when data is transmitted to an arbitrary terminal at an arbitrary time. This channel is characterized in that it includes control information necessary for demodulation of the transmission data. A description of the control information is made using Table 1. Table 1 shows a message format of the shared control channel used in the prior art, and the message is transmitted over the shared control channel.

Referring to Table 1, 'Block type' is a field indicating a type of the message. 'MAC ID' is a field indicating an identifier (ID) of a terminal. That is, after receiving the shared control channel, the terminal checks the MAC ID included in the shared control channel and determines whether the received MAC ID is equal to the MAC ID previously agreed upon between the terminal itself and the base station, thereby determining whether there is any data being transmitted to the terminal itself. Although the MAC ID is included herein in the message of the shared control channel of Table 1, rather than being included in the message of the shared control channel, it can be transmitted by scrambling the message of the shared control channel using a MAC ID-specific scrambling sequence of the target user. A 'Persistent' field indicates whether the resources allocated to the terminal itself are persistent resources or non-persistent resources. 'Channel Identifier (ChanID)' is an ID for the allocated resource. 'Packet Format (PF)' is a field indicating a modulation order (QPSK, 8PSK, 16QAM, etc.) and a code rate used for data transmission. 'Extended Transmission (Ext. Tx)' is the information indicating a time length of the transmission data. 'Rank' indicates the number of data streams transmitted via multiple antennas.

In Table 1, Forward Link Assignment Message (FLAM) indicates that the corresponding message is a message for forward resource allocation. MCW indicates that the multiple data streams transmitted via multiple antennas are the data streams that underwent channel coding (for example, turbo coding) independently of each other. SCW indicates that the multiple data streams transmitted via multiple antennas are parts of the codeword that underwent one channel coding.

In Table 1, numerals shown in the shaded part indicate whether the message type includes a particular field. For example, Rank field is '0' for FLAM, but Rank field is '1' for SCW FLAM. Because the FLAM is a message type used for SIMO transmission, it has no Rank field used for transmission of multiple streams. However, because multiple streams can be transmitted, the SCW FLAM needs the rank information.

TABLE 1

| Field | Block type | MACID | Persistent | ChanID | PF | Ext. TX | Rank |
|---|---|---|---|---|---|---|---|
| # bits | 3 | 9-11 | 1 | 6-8 | 4-6 | 1 | 2 |
| FLAM | 00 | 1 | 1 | 1 | 1 | 1 | 0 |
| MCW FLAM1 | 01 | 1 | 1 | 1 | 1 | 1 | 0 |
| MCW FLAM2 | 10 | 1 | 0 | 0 | 3 | 1 | 0 |
| SCW FLAM | 11 | 1 | 1 | 1 | 1 | 1 | 1 |

The foregoing conventional shared control channel's message format is not suitable for forward data transmission supporting various antenna technologies including the precoding technology. For example, in the system supporting the common pilots, the data receiver, or terminal, should have the information indicating which precoding is used for the data transmission. However, such information is not included in the message. In addition, when the data transmitter transmits data by applying SISO, Spatial Time Transmit Diversity (STTD), etc. without applying the precoding, the data receiver cannot detect the application of the SISO or STTD technology.

SUMMARY OF THE INVENTION

The present invention has been made to address at least the above problems and/or disadvantages and to provide at least the advantages described below. Accordingly, an aspect of the present invention provides an apparatus and method for efficiently transmitting/receiving a message of a forward shared control channel in an OFDMA wireless communication system that transmits data over a forward link using various antenna technologies.

Another aspect of the present invention provides an apparatus and method for transmitting/receiving a message of the forward shared control channel.

An additional aspect of the present invention provides an apparatus and method for transmitting/receiving a message of a forward shared control channel so as to identify Transmit Diversity (TD) technologies agreed upon between a base station and a terminal to determine which precoding is used for data transmission in an OFDMA wireless communication system.

A further aspect of the present invention is to provide an apparatus and method for transmitting/receiving a message of a forward shared control channel so as to distinguish that a data transmitter transmits data by applying SISO, STTD, etc. without applying precoding in an OFDMA wireless communication system.

According to one aspect of the present invention, a method for transmitting a shared control channel message in an OFDMA wireless communication system is provided. Feedback information is received from a terminal. It is determined whether to transmit data by applying precoding. Control information is transmitted in the shared control channel message. The control information message type is differently set according to the application of the precoding.

According to another aspect of the present invention, a method for receiving a shared control channel message in an OFDMA wireless communication system is provided. The shared control channel message is received from a base station. A message type of the shared control channel message is determined. Data is demodulated by at least one of SISO and STTD as indicated by the TD-FLAM, when the message type is a TD FLAM.

According to an additional aspect of the present invention, a method for transmitting a shared control channel message in an OFDMA wireless communication system is provided. It is determined whether to transmit data by applying precoding. Control information is transmitted in the shared control channel message over a TD FLAM when determining whether to transmit the data without applying the preceding. The TD-FLAM includes information indicating which TD is used.

According to a further aspect of the present invention, an apparatus is provided for transmitting a shared control channel message in an OFDMA wireless communication system. The message transmission apparatus includes a controller for determining whether to transmit data by applying precoding. When determining whether to transmit data without applying the preceding, the controller transmits control information in the shared control channel message over a TD-FLAM. The TD-FLAM includes information indicating which TD is used.

According to yet another aspect of the present invention, an apparatus is provided for receiving a shared control channel message in an OFDMA wireless communication system. The message reception apparatus includes a reception unit for receiving the shared control channel message from a base station. The message reception apparatus also includes a controller for determining a message type of the shared control channel message, and if the message type is a TD-FLAM, demodulating data as indicated by the TD-FLAM. The TD-FLAM includes information indicating which TD is used.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Figure 1:
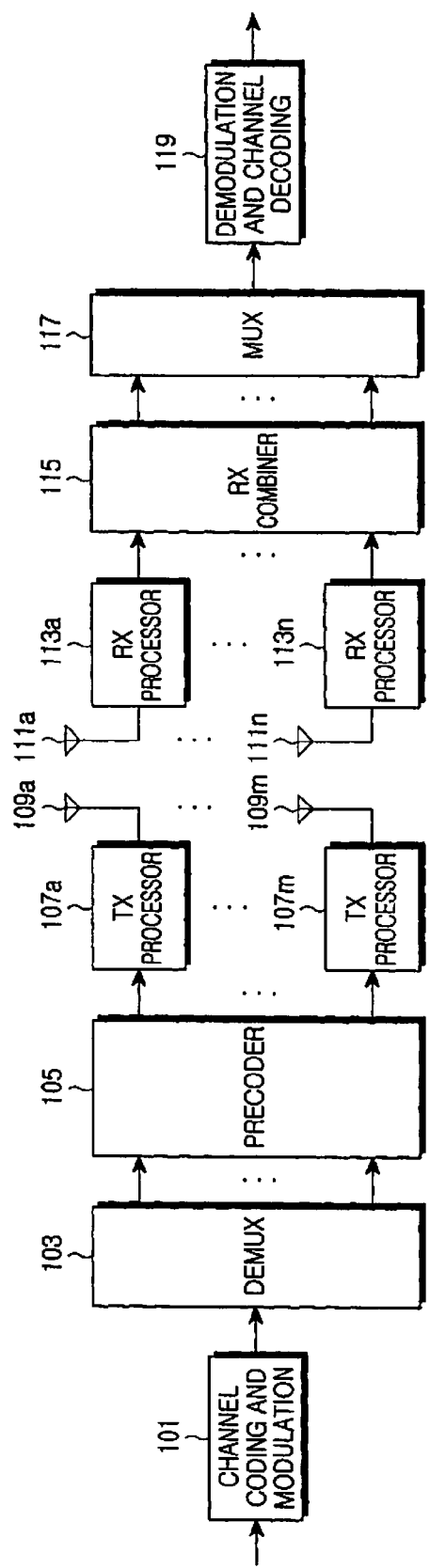
FIG. 1 is a diagram illustrating a structure of an SCW MIMO transceiver.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

The present invention relates to a method and apparatus for configuring and transmitting/receiving a message of a Forward Shared Control Channel (F-SCCH) to support various antenna technologies for forward data transmission in a wireless communication system using OFDMA. Although the present invention will be described herein with reference to the system supporting both the common pilots and the dedicated pilots, it should be noted that the present invention can be applied to the systems supporting any one of the common pilots and the dedicated pilots.

In addition, although the message of the shared control channel proposed by the present invention includes even the particular fields not directly related to the present invention, such as 'Persistent' and 'PF' fields, by way of example, the message may include only the particular fields defined in an embodiment of the present invention, or may further include other fields used for other purposes.

Table 2 and Table 3 show message formats of the shared control channel according to a preferred embodiment of the present invention. Among them, Table 2 corresponds to a first embodiment and Table 3 corresponds to a second embodiment.

Figure 5:
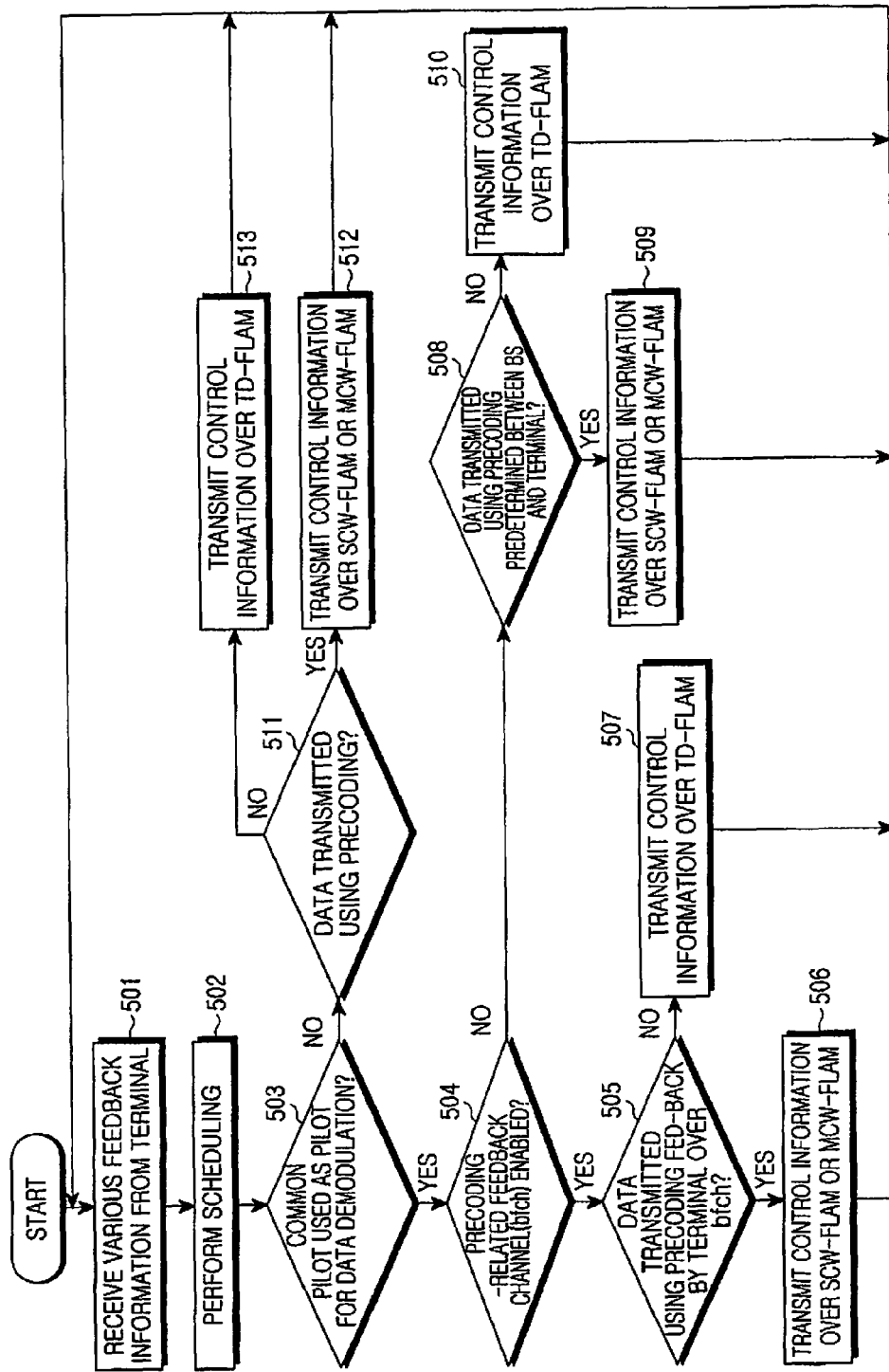
FIG. 5 is a flow diagram illustrating a method for transmitting a message of a forward shared control channel depending on various antenna technologies used for forward data transmission, according to an embodiment of the present invention.

In Table 2 and Table 3, the underlined portions are newly proposed by the present invention. TD-FLAM is used in Table 2 and Table 3 rather than the conventional FLAM to indicate the use/nonuse of the TD technology for data transmission, and to specifically indicate which TD technology is used for the TD-FLAM. Although the term 'TD-FLAM' is used herein, the original term 'FLAM' can be used instead, or the term 'Open Loop (OL)-FLAM' can be used. The term 'OL' as used herein refers to an antenna technology that operates without receiving the precoding-related feedback from the terminal. This technology covers the case where the base station transmits data using a specific diversity technology without using the precoding fed back (or designated) by the terminal, even when the terminal transmits the precoding-related feedback. That is, 'Rank' in the example of Table 2 or 'TD-scheme' in the example of Table 3, is a field having the same function. This is a field for indicating whether SISO (which can be replaced with SIMO according to the number of receive antennas in the terminal) is used for forward data transmission, or a TD technology, for example, STTD technology, is used for forward data transmission. Further, this field is used for distinguishing even the information on rank-1 STTD, rank-2 STTD and rank-3 STTD divided from the STTD technology. With reference to FIG. 5, a detailed description is provided regarding how to use this field ('Rank' in Table 2 or 'TD-scheme' in Table 3).

TABLE 2

| Field | Block type | MACID | Persistent | ChanID | PF | Ext. TX | Rank |
|---|---|---|---|---|---|---|---|
| # bits | 3 | 9-11 | 1 | 6-8 | 4-6 | 1 | 2 |
| TD-FLAM | 00 | 1 | 1 | 1 | 1 | 1 | 1 |
| MCW FLAM1 | 01 | 1 | 1 | 1 | 1 | 1 | 0 |
| MCW FLAM2 | 10 | 1 | 0 | 0 | 3 | 1 | 0 |
| SCW FLAM | 11 | 1 | 1 | 1 | 1 | 1 | 1 |

TABLE 3

| Field | Block type | MACID | Persistent | ChanID | PF | Ext. TX | Rank | TD-Scheme |
|---|---|---|---|---|---|---|---|---|
| # bits | 3 | 9-11 | 1 | 6-8 | 4-6 | 1 | 2 | 2 |
| TD-FLAM | 00 | 1 | 1 | 1 | 1 | 1 | 0 | 1 |
| MCW FLAM1 | 01 | 1 | 1 | 1 | 1 | 1 | 0 | 0 |
| MCW FLAM2 | 10 | 1 | 0 | 0 | 3 | 1 | 0 | 0 |
| SCW FLAM | 11 | 1 | 1 | 1 | 1 | 1 | 1 | 0 |

FIG. 5 is a flow diagram illustrating a method for transmitting a message of a forward shared control channel depending on various antenna technologies used for forward data transmission according to an embodiment of the present invention.

Referring to FIG. 5, a base station receives a variety of feedback information from a terminal in step 501. The feedback information includes channel quality information, preceding information, etc. Reverse channels over which the feedback information is transmitted include Channel Quality Indicator Channel (CQICH), Beam Index Feedback Channel (BCH), MIMO Quality Indication Channel (MQICH), Subband Feedback Channel (SFCH), etc.

The CQICH is a channel used for feeding back forward channel quality information for a SISO channel. The CQICH is a channel used for feeding back channel quality information for the full available band of the system. The BFCH is a channel used for feeding back precoding (or beamforming)-related information, i.e., ID information for the preceding preferred by the terminal. The MQICH is a channel used for feeding back a plurality of channel quality information. The plurality of channel quality information indicates channel quality information for each of the layers or beams. The SFCH is a channel used for feeding back channel quality information for each subband. The SFCH transmits, along with a subband ID, channel quality information of a subband corresponding to the subband ID. Although the feedback channels can be configured such that all of the four types of the above-described feedback channels are transmitted from one terminal, it should be noted that only some of them can be enabled. The rule for determining which feedback channel the base station will enable and which feedback channel the base station will disable is commonly agreed upon between the base station and the terminal by Layer-3 signaling.

In step 502, the base station performs scheduling using a variety of the other information necessary for scheduling, including the feedback information received in step 501. The variety of information necessary for scheduling can include the amount (buffer information) of data that the base station should transmit to each user, and Quality of Service (QoS). The phrase 'performing scheduling' as used herein refers to an operation in which the base station determines data of which user it will transmit over which subcarrier, determines by which antenna technology it will transmit the data, and determines which modulation scheme and code rate it will use.

In step 503, the base station determines whether it uses a common pilot or a dedicated pilot at a corresponding time. If it is determined that the base station uses the common pilot, the base station proceeds to step 504 where it determines whether the precoding-related feedback, i.e., BFCH, in the feedback from the terminal that intends to transmit data at the corresponding time according to the result of step 502, is enabled. If it is determined in step 504 that the BFCH is enabled, the base station proceeds to step 505 where it determines whether during data transmission to the scheduled terminal, the base station transmits the data using the precoding scheme recently fed back by the terminal over the BFCH. If it is determined in step 505 that the base station transmits the data using the precoding scheme recently fed back, or received, from the terminal over the BFCH, the base station transmits, in step 506, control information to the terminal using SCW-FLAM and MCW-FLAM.

However, if it is determined in step 505 that the base station does not transmit the data using the precoding scheme recently fed back by the terminal over the BFCH during data transmission to the scheduled terminal, the base station transmits control information to the terminal using TD-FLAM in step 507. The TD-FLAM is characterized in that it is defined to identify the TD technologies (including random beamforming) agreed upon between the base station and the terminal. As a detailed example, the 2-bit Rank field of Table 2 and the 2-bit TD-scheme field of Table 3 can be defined as follows.

Embodiment 1 for Meaning of 2-Bit TD-Scheme Field

00: SISO (replaceable with SIMO according to the number of receive antennas of terminal)
01: STTD rate 1
10: STTD rate 2
11: Spatial Multiplexing (SM) (for rank 4)

Embodiment 2 for Meaning of 2-Bit TD-Scheme Field

00: SISO (replaceable with SIMO according to the number of receive antennas of terminal)
01: STUD rate 1
10: STTD rate 2
11: STTD rate 3

Embodiment 3 for Meaning of 2-Bit TD-Scheme Field

00: STUD rate 1
01: STUD rate 2
10: STTD rate 3
11: SM (for rank 4)

In the foregoing description, STTD rate 1 indicates rank-1 STUD transmission, STTD rate 2 indicates rank-2 STTD transmission, and STTD rate 3 indicates rank-3 STUD transmission. In addition, SM for rank 4 refers to a technology for multiplexing 4 streams to 4 antennas.

If it is determined in step 504 that the precoding-related feedback, i.e., BFCH, is not enabled, the base station proceeds to step 508 where it determines whether it transmits data by applying the precoding, if any, previously agreed upon between the base station and the terminal. If the base station transmits data by applying the precoding, if any, previously agreed upon between the base station and the terminal, the base station proceeds to step 509 where it transmits control information using SCW-FLAM and MCW-FLAM.

However, if it is determined in step 508 that there is no precoding scheme previously agreed upon between the base station and the terminal or the base station does not transmit data by applying the agreed precoding, the base station proceeds to step 510 where it transmits control information using TD-FLAM. The TD-FLAM is characterized in that it is defined to identify the TD technologies (including random beamforming) agreed upon between the base station and the terminal. For meanings of the 2-bit TD-scheme field of the TD-FLAM, reference can be made to Embodiments 1 to 3 for Meaning of 2-bit TD-scheme Field.

If it is determined in step 503 that the base station uses the dedicated pilot rather than the common pilot as a pilot for data demodulation at the corresponding time, the base station proceeds to step 511 where it determines whether preceding is applied for the data transmission. If it is determined that the precoding is applied for the data transmission, the base station transmits control information using SCW-FLAM and MCW-FLAM in step 512. However, if it is determined in step 511 that the precoding is not applied for the data transmission, the base station transmits control information using TD-FLAM in step 513. The TD-FLAM is characterized in that it is defined to identify the TD technologies (including random beamforming) agreed upon between the base station and the terminal. For meanings of the 2-bit TD-scheme field of the TD-FLAM, reference can be made to Embodiments 1 to 3 for Meaning of 2-bit TD-scheme Field.

Figure 6:
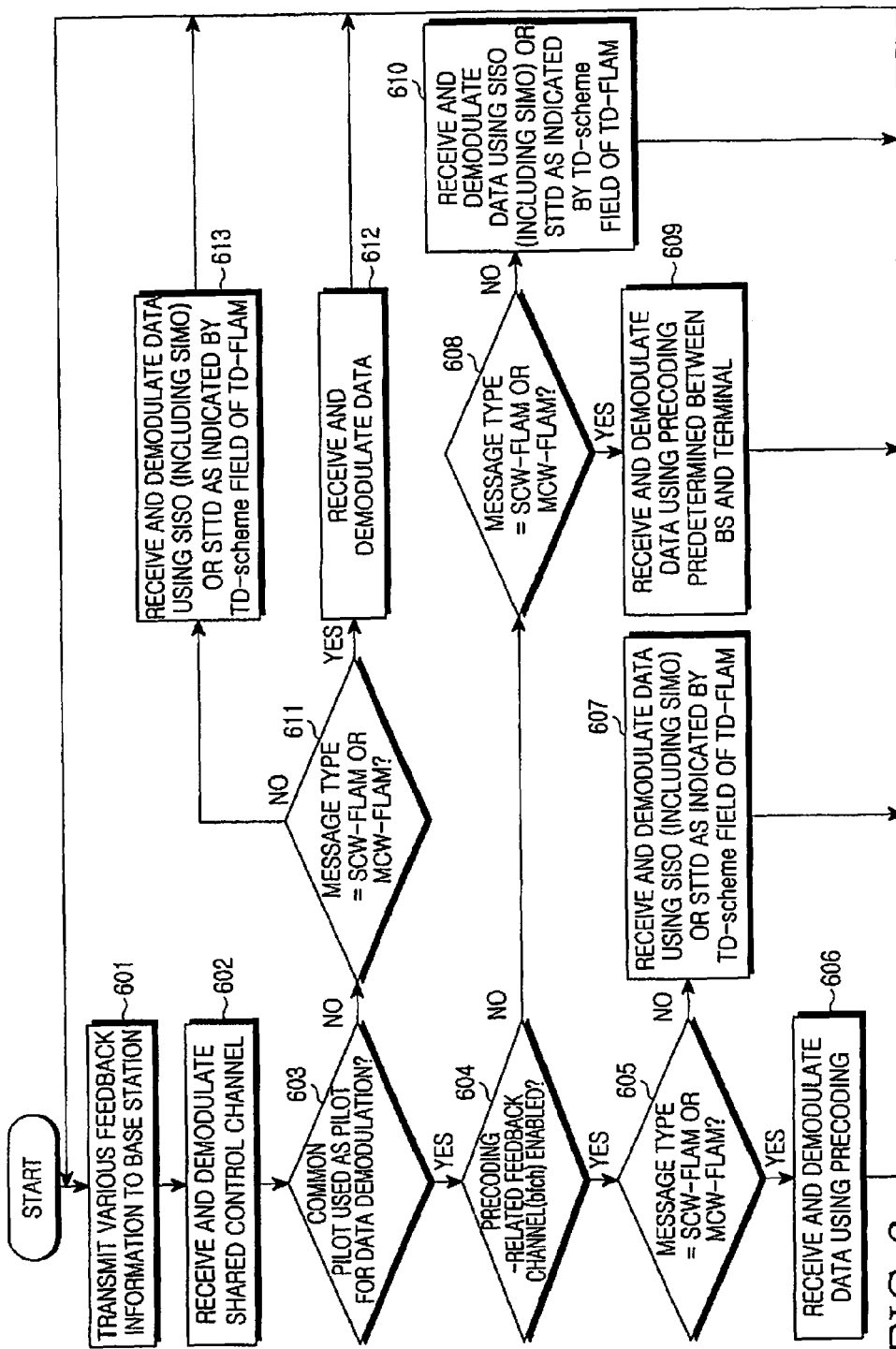
FIG. 6 is a flow diagram illustrating a process in which to demodulate data transmitted over the forward link, a terminal receives a shared control channel, analyzes its message, and demodulates a data channel depending on the analysis result, according to an embodiment of the present invention.

FIG. 6 is a flow diagram illustrating a process in which to demodulate data transmitted over the forward link, a terminal receives a shared control channel, analyzes its message, and demodulates a data channel depending on the analysis result, according to an embodiment of the present invention.

Referring to FIG. 6, a terminal transmits in step 601a variety of feedback information to a base station over the reverse link. The feedback information includes the feedback information described in 501 of FIG. 5. In step 602, the terminal receives a shared control channel from the base station, and demodulates it to acquire a message. In step 603, the terminal determines whether the base station uses the common pilot or uses the dedicated pilot at the corresponding time. If it is determined that the base station uses the common pilot, the terminal proceeds to step 604 where it determines whether the precoding-related feedback, i.e., BFCH, in the feedback channel of the terminal, is enabled. If the BFCH is enabled, the terminal proceeds to step 605 where it determines whether a message type (Block type in Table 2 and Table 3) of the received shared control channel is SCW-FLAM or MCW-FLAM. If the message type is SCW-FLAM or MCW-FLAM, the terminal receives and demodulates the data by applying the precoding in step 606.

If it is determined in step 605 that the message type is not SCW-FLAM or MCW-FLAM, the terminal receives and demodulates the data in step 607 using the SISO or STTD technology as designated by the TD-scheme field of the TD-FLAM. For meanings of the 2-bit TD-scheme field of the TD-FLAM, reference can be made to Embodiments 1 to 3 for Meaning of 2-bit TD-scheme Field.

If it is determined in step 604 that the BFCH is not enabled, the terminal proceeds to step 608 where it determines whether a message type (Block type in Table 2 and Table 3) of the received shared control channel is SCW-FLAM or MCW-FLAM. If the message type is SCW-FLAM or MCW-FLAM, the terminal receives and demodulates the data by applying the preceding in step 609. However, if it is determined in step 608 that the message type is not SCW-FLAM or MCW-FLAM, the terminal receives and demodulates in step 610 the data using the SISO or STTD technology as designated by the TD-scheme field of the TD-FLAM. For meanings of the 2-bit TD-scheme field of the TD-FLAM, reference can be made to Embodiments 1 to 3 for Meaning of 2-bit TD-scheme Field.

If it is determined in step 603 that the base station does not use the common pilot at the corresponding time, the terminal proceeds to step 611 where it determines whether a message type (Block type of Table 2 and Table 3) of the received shared control channel is SCW-FLAM or MCW-FLAM. If the message type (Block type of Table 2 and Table 3) of the received shared control channel is SCW-FLAM or MCW-FLAM, the terminal receives and demodulates the data by applying the precoding in step 612. However, if it is determined in step 611 that the message type of the received shared control channel is not SCW-FLAM or MCW-FLAM, the terminal receives and demodulates in step 613 the data using the SISO or STTD technology as designated by the TD-scheme field of the TD-FLAM. For meanings of the 2-bit TD-scheme field of the TD-FLAM, reference can be made to Embodiments 1 to 3 for Meaning of 2-bit TD-scheme Field.

Figure 7:
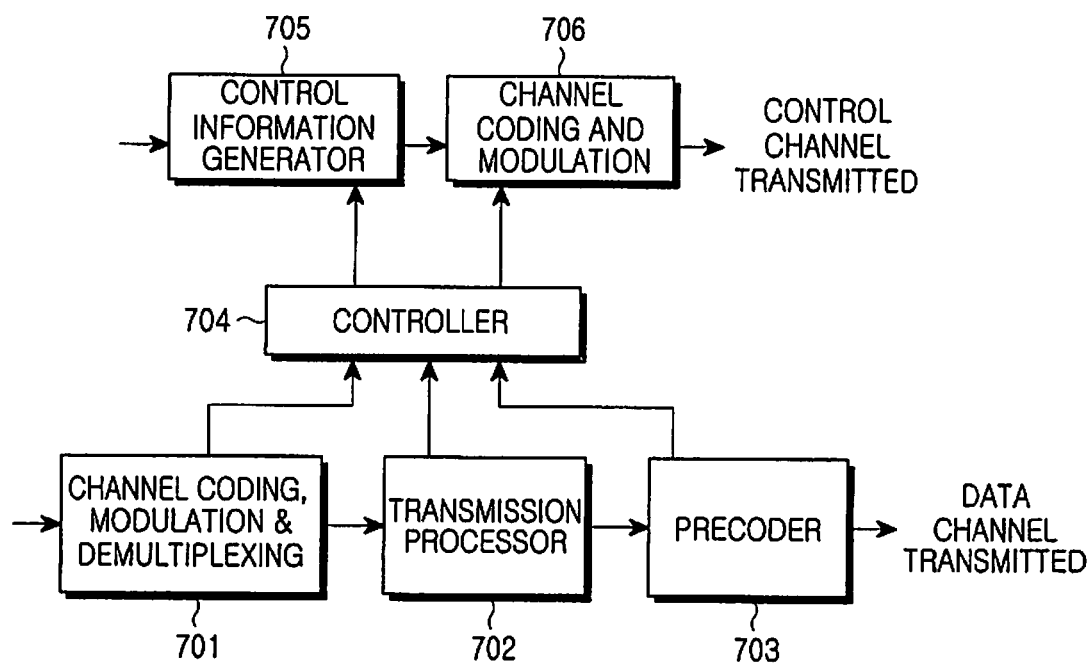
FIG. 7 is a diagram illustrating a structure of a transmitter according to an embodiment of the present invention.

FIG. 7 is a diagram illustrating a structure of a transmitter according to an embodiment of the present invention.

Referring to FIG. 7, the transmitter includes a channel coding, modulation & demultiplexing unit 701, a transmission processor 702, a precoder 703, a controller 704, a control information generator 705, and a channel coding and modulation unit 706.

Figure 2:
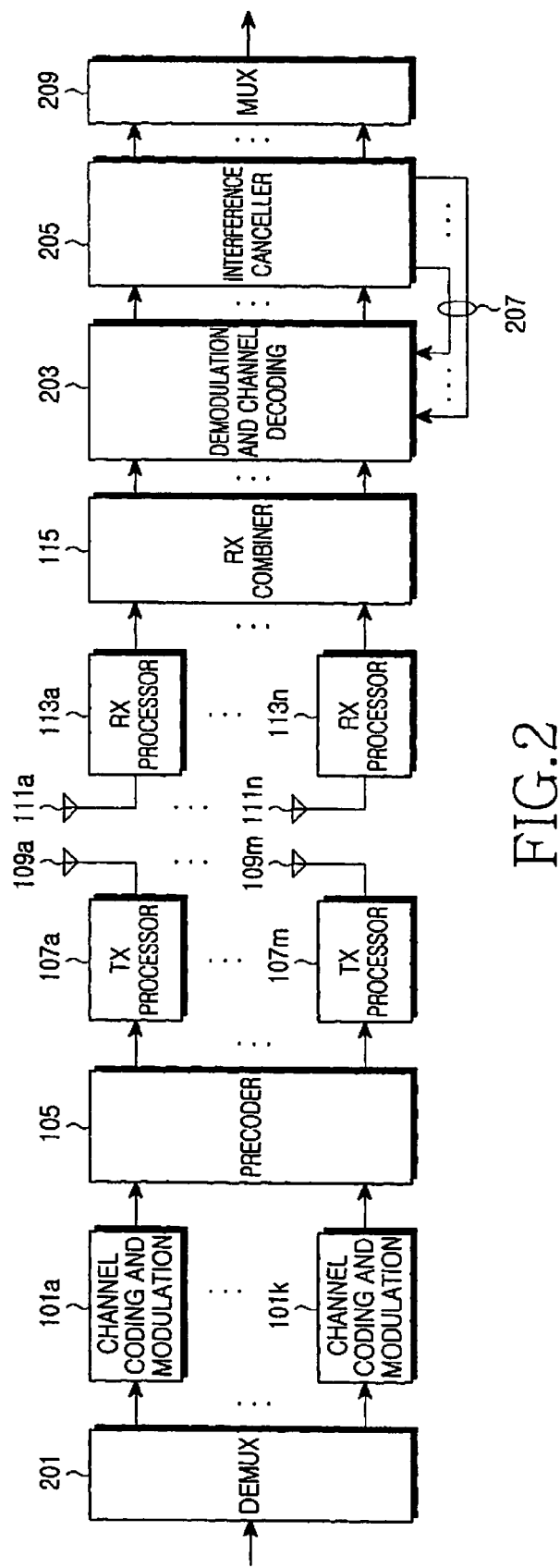
FIG. 2 is a diagram illustrating a structure of an MCW MIMO transceiver.
Figure 3:
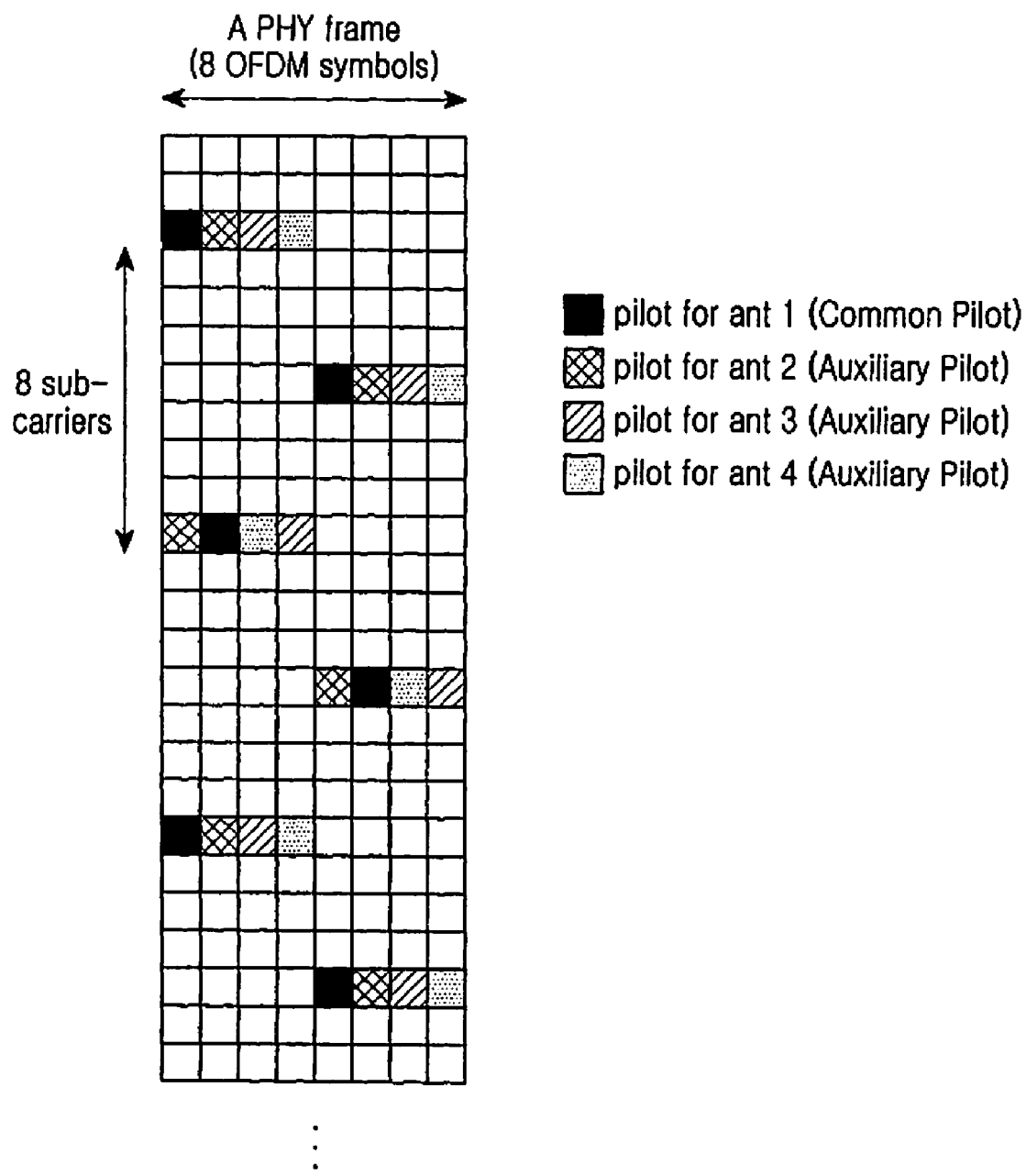
FIG. 3 is a diagram illustrating an example of common pilots.
Figure 4:
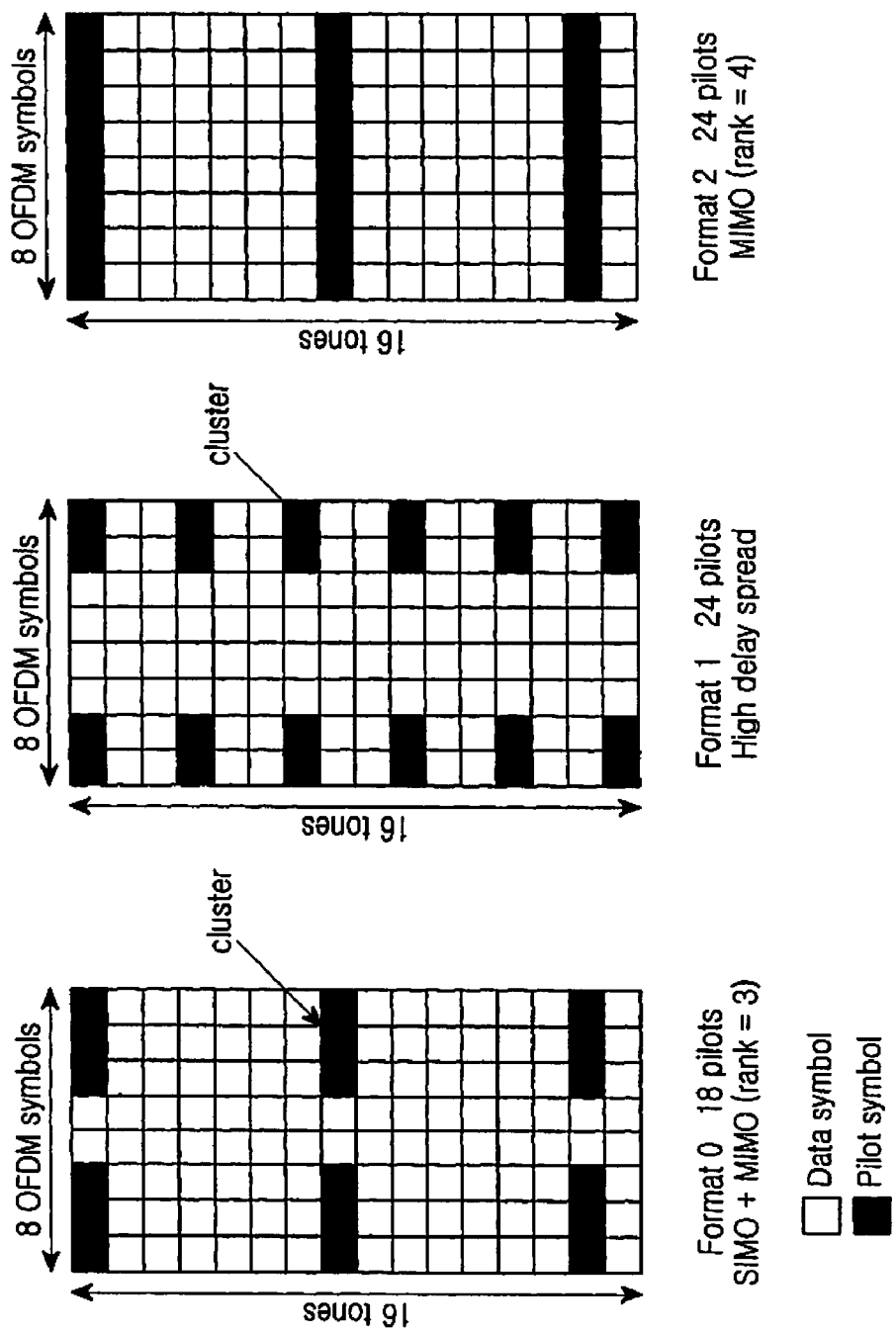
FIG. 4 is a diagram illustrating an example of dedicated pilots.

The channel coding, modulation & demultiplexing unit 701, the transmission processor 702, and the precoder 703 are equal in structure and operation to the corresponding elements described with reference to FIGS. 1 and 2.

The controller 704 receives, from the channel coding, modulation & demultiplexing unit 701, the transmission processor 702 and the precoder 703, the information indicating which transmission scheme is used for data transmission, and controls a control information transmission method of the control information generator 705 and the channel coding and modulation unit 706 depending on the received information. Although the description of FIG. 7 is directed to the example where the controller 704 acquires the information on the transmission scheme used for a data channel from the channel coding, modulation & demultiplexing unit 701, the transmission processor 702 and the precoder 703, it should be noted that the same can be applied to another example where the controller 704 can directly acquire the information on the transmission scheme used for the data channel from a scheduler though it is not shown in FIG. 7. A detailed control operation of the controller 704 has been described in FIG. 5. The controller 704 controls the control information generator 705 to configure the control information as described above, and controls the channel coding and modulation unit 706 to perform a channel coding and modulation process on the generated control information and to transmit it over a control channel.

Figure 8:
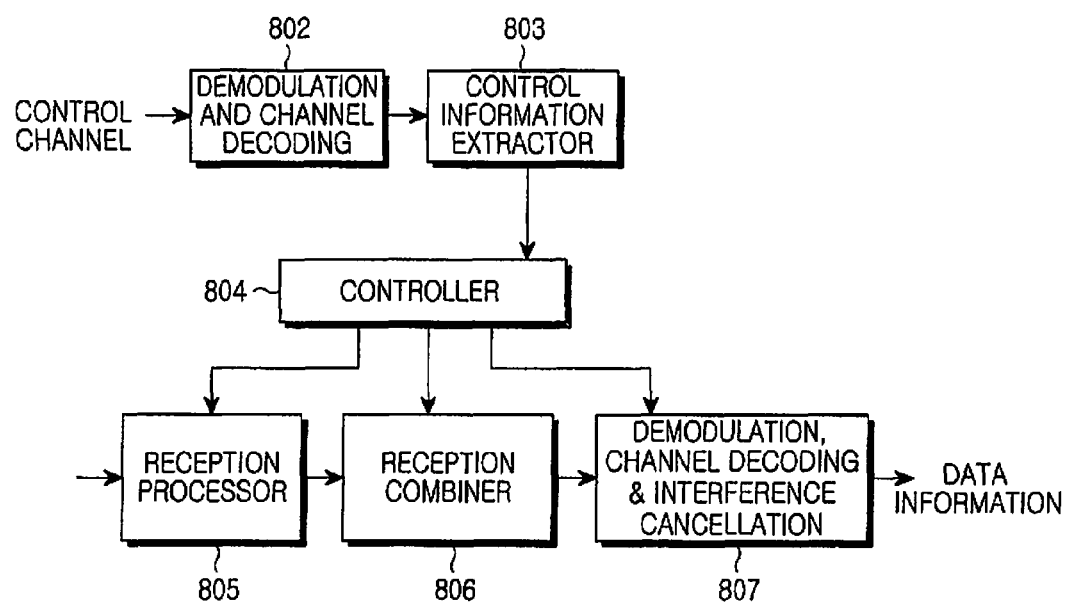
FIG. 8 is a diagram illustrating a structure of a receiver according to an embodiment of the present invention.

FIG. 8 is a diagram illustrating a structure of a receiver according to an embodiment of the present invention.

Referring to FIG. 8, the receiver includes a demodulation and channel decoding unit 802, a control information extractor 803, a controller 804, a reception processor 805, a reception combiner 806, and a demodulation, channel decoding & interference cancellation unit 807.

A control channel reception unit composed of the demodulation and channel decoding unit 802 and the control information extractor 803 extracts control information through a demodulation and channel decoding process on the signal received over a specific control channel. The extracted control information is input to the controller 804. The controller 804 controls a data channel reception unit composed of the reception processor 805, the reception combiner 806 and the demodulation, channel decoding & interference cancellation unit 807 using the method described in FIG. 6. A detailed description of the reception processor 805, the reception combiner 806 and the demodulation, channel decoding & interference cancellation unit 807 has been made in FIGS. 1 and 2.

As is apparent from the foregoing description, according to the present invention, the use of the message configuration method for the forward shared control channel can reduce the overhead of the shared control channel, and facilitate the efficient utilization of the various antenna technologies in the OFDMA packet data mobile communication system, thereby contributing to the expected increase in the capacity.

In addition, the present invention can identify the TD technologies agreed upon between the base station and the terminal to determine which precoding is used for data transmission in the system supporting the common pilots.

Further, according to the present invention, when the data transmitter transmits the data by applying the SISO or STTD technology without applying the preceding, the data receiver can detect the application of the SISO or STTD technology.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting a shared control channel message in an Orthogonal Frequency Division Multiple Access (OFDMA) wireless communication system, the method comprising the steps of:
    receiving feedback information from a terminal;
    determining whether to transmit data by applying precoding; and
    transmitting, in the shared control channel message, control information whose message type is differently set according to the application of the precoding.

2. The method of claim 1, further comprising:
    transmitting control information in the shared control channel message over a Transmit Diversity (TD)-Forward Link Assignment Message (FLAM), when determining to transmit the data without applying the precoding;
    wherein the TD-FLAM comprises information indicating at least one of use and nonuse of the TD or indicating which TD is used.

3. The method of claim 2, wherein the TD-FLAM comprises information indicating which of Single Input Single Output (SISO) and Spatial Time Transmit Diversity (STTD) is used for forward data transmission.

4. The method of claim 3, wherein the TD-FLAM further comprises information indicating which of rank-1 STTD, rank-2 STTD, and rank-3 STTD is used for forward data transmission.

5. The method of claim 1, further comprising:
    transmitting control information over at least one of a Single-CodeWord-Forward Link Assignment Message (SCW-FLAM) and a Multi-CodeWord-Forward Link Assignment Message (MCW-FLAM), when transmitting the data by applying the precoding.

6. The method of claim 1, further comprising:
    determining whether a precoding-related feedback channel is enabled;
    determining whether to transmit data by applying the precoding fed back by the terminal over the precoding-related feedback channel, when the precoding-related feedback channel is enabled; and
    transmitting control information in the shared control channel message over a TD-FLAM, when determining to transmit data without applying the precoding fed back by the terminal over the precoding related feedback channel.

7. The method of claim 6, wherein the TD-FLAM comprises information indicating which of SISO and STTD is used for forward data transmission.

8. The method of claim 7, wherein the TD-FLAM further comprises information indicating which of rank-1 STTD, rank-2 STTD, and rank-3 STTD is used for forward data transmission.

9. The method of claim 6, further comprising:
    transmitting control information over at least one of an SCW-FLAM and an MCW-FLAM, when transmitting the data by applying the precoding.

10. The method of claim 6, further comprising:
    determining whether to transmit data by applying the precoding previously agreed upon with the terminal, when the precoding-related feedback channel is not enabled; and
    transmitting control information in the shared control channel message over a TD-FLAM, when determining to transmit data without applying the precoding previously agreed upon with the terminal.

11. The method of claim 10, wherein the TD-FLAM comprises information indicating which of SISO and STTD is used for forward data transmission.

12. The method of claim 11, wherein the TD-FLAM further comprises information indicating which of rank-1 STTD, rank-2 STTD, and rank-3 STTD is used for forward data transmission.

13. The method of claim 10, further comprising:
    transmitting control information over at least one of an SCW-FLAM and an MCW-FLAM, when transmitting the data by applying the precoding previously agreed upon with the terminal.

14. A method for receiving a shared control channel message in an Orthogonal Frequency Division Multiple Access (OFDMA) wireless communication system, the method comprising the steps of:
    receiving the shared control channel message from a base station;
    determining a message type of the shared control channel message; and
    demodulating data by at least one of Single Input Single Output (SISO) and Spatial Time Transmit Diversity (STTD) as indicated by a Transmit Diversity (TD)-Forward Link Assignment Message (FLAM), when the message type is TD-FLAM.

15. The method of claim 14, further comprising:
    demodulating data by at least one of rank-1 STTD, rank-2 STTD, and rank-3 STTD as indicated by the TD-FLAM, when the message type is TD-FLAM.

16. The method of claim 15, further comprising:
    demodulating data by applying precoding, when the message type is at least one of a Single-CodeWord-Forward Link Assignment Message (SCW-FLAM) and a Multi-CodeWord-Forward Link Assignment Message (MCW-FLAM).

17. The method of claim 14, further comprising:
    determining whether a precoding-related feedback channel is enabled;
    determining the message type, if the precoding-related feedback channel is enabled;
    demodulating data by at least one of SISO and STTD as indicated by the TD-FLAM, if the message type is a TD-FLAM; and
    demodulating data by applying precoding, if the message type is at least one of an SCW-FLAM and an MCW-FLAM.

18. The method of claim 17, further comprising:
    demodulating data by at least one of rank-1 STTD, rank-2 STTD, and rank-3 STTD as indicated by the TD-FLAM, if the message type is a TD-FLAM.

19. The method of claim 17, further comprising:
    determining the message type, if the precoding-related feedback channel is not enabled;
    demodulating data by at least one of SISO and STTD as indicated by the TD-FLAM, if the message type is TD-FLAM; and demodulating data by applying the precoding previously agreed upon with the base station, if the message type is at least one of an SCW-FLAM and an MCW-FLAM.

20. The method of claim 19, further comprising:
demodulating data by at least one of rank-1 STTD, rank-2 STTD, and rank-3 STTD as indicated by the TD-FLAM, if the message type is a TD-FLAM.

21. A method for transmitting a shared control channel message in an Orthogonal Frequency Division Multiple Access (OFDMA) wireless communication system, the method comprising the steps of:
determining whether to transmit data by applying precoding;
transmitting control information in the shared control channel message over a Transmit Diversity (TD)-Forward Link Assignment Message (FLAM), when determining to transmit the data without applying the precoding;
wherein the TD-FLAM comprises information indicating which TD is used.

22. The method of claim 21, wherein the TD-FLAM further comprises information indicating use/nonuse of the TD.

23. An apparatus for transmitting a shared control channel message in an Orthogonal Frequency Division Multiple Access (OFDMA) wireless communication system, the apparatus comprising:
a controller for determining whether to transmit data by applying precoding, and when determining to transmit data without applying the precoding, transmitting control information in the shared control channel message over a Transmit Diversity (TD)-Forward Link Assignment Message (FLAM);
wherein the TD-FLAM comprises information indicating which TD is used.

24. The apparatus of claim 23, wherein the TD-FLAM further comprises information indicating use/nonuse of the TD.

25. The apparatus of claim 23, wherein the TD-FLAM further comprises information indicating which of Single Input Single Output (SISO) and Spatial Time Transmit Diversity (STTD) is used for forward data transmission.

26. The apparatus of claim 25, wherein the TD-FLAM further comprises information indicating which of rank-1 STTD, rank-2 STTD, and rank-3 STTD is used for forward data transmission.

27. An apparatus for receiving a shared control channel message in an Orthogonal Frequency Division Multiple Access (OFDMA) wireless communication system, the apparatus comprising:
a reception unit for receiving the shared control channel message from a base station; and
a controller for determining a message type of the shared control channel message, and if the message type is a Transmit Diversity (TD)-Forward Link Assignment Message (FLAM), demodulating data as indicated by the TD-FLAM;
wherein the TD-FLAM comprises information indicating which TD is used.

28. The apparatus of claim 27, wherein the TD-FLAM further comprises information indicating use/nonuse of the TD.

29. The apparatus of claim 27, wherein the controller demodulates data by at least one of Single Input Single Output (SISO) and Spatial Time Transmit Diversity (STTD) as indicated by the TD-FLAM.

30. The apparatus of claim 27, wherein the controller demodulates data by at least one of rank-1 STTD, rank-2 STTD, and rank-3 STTD as indicated by the TD-FLAM.

31. A method for transmitting a downlink shared channel in an Orthogonal Frequency Division Multiple Access (OFDMA) wireless communication system, the method comprising the steps of:
configuring transmission information for a downlink control channel via higher layer signaling;
transmitting the downlink control channel comprising transmission scheme information for downlink shared channel data to a terminal with a format corresponding to the transmission information; and
transmitting the downlink shared channel data to the terminal according to the transmission scheme information,
wherein the transmission scheme information indicates that a Transmit Diversity or Open-Loop Spatial Multiplexing is used for transmitting the downlink shared channel data.

32. The method of claim 31, wherein the transmission information indicates Open-loop transmission.

33. A method for receiving a downlink shared channel in an Orthogonal Frequency Division Multiple Access (OFDMA) wireless communication system, the method comprising the steps of:
configuring transmission information for a downlink control channel via higher layer signaling;
receiving the downlink control channel comprising transmission scheme information for downlink shared channel data from a base station with a format corresponding to the transmission information;
receiving the downlink shared channel data from the base station; and
demodulating the downlink shared channel data according to the transmission scheme information included in the format,
wherein the transmission scheme information indicates that a Transmit Diversity or Open-Loop Spatial Multiplexing is used for transmitting the downlink shared channel data.

34. The method of claim 33, wherein the transmission scheme information indicates Open-Loop transmission.

35. An apparatus for transmitting downlink shared channel in an Orthogonal Frequency Division Multiple Access (OFDMA) wireless communication system, the apparatus comprising:
a control information generator for configuring transmission information for downlink control channel via higher layer signaling;
a transmission unit for transmitting the downlink control channel comprising transmission scheme information for downlink shared channel data and the downlink shared channel data to the terminal; and
a controller for controlling the transmission unit to transmit the downlink control channel with a format corresponding to the transmission information and to transmit the downlink shared channel data according to the transmission scheme information,
wherein the transmission scheme information indicates that a Transmit Diversity or Open-Loop Spatial Multiplexing is used for transmitting the downlink shared channel data.

36. The apparatus of claim 35, wherein the transmission information indicates Open-loop transmission.

37. An apparatus for receiving downlink shared channel in an Orthogonal Frequency Division Multiple Access (OFDMA) wireless communication system, the apparatus comprising:

a reception unit for receiving downlink control channel comprising transmission scheme information for downlink shared channel data and downlink shared channel data from a base station;

a control information extractor for configuring transmission information for the downlink control channel via higher layer signaling;

a demodulator for demodulating the downlink shared channel data; and a controller for controlling the reception unit to receive the downlink control channel with a format corresponding to the transmission information and the demodulator to demodulate the downlink shared channel data according to the transmission scheme information included in the format, wherein the transmission scheme information indicates that a Transmit Diversity or Open-Loop Spatial Multiplexing is used for transmitting the downlink shared channel data.

38. The apparatus of claim 37, wherein the transmission information indicates Open-loop transmission.

* * * * *